US012608095B2

(12) United States Patent (10) Patent No.: US 12,608,095 B2
Tabeta et al. (45) Date of Patent: Apr. 21, 2026

(54) MOUSE AND REPLACEMENT SUPPORT KIT

(71) Applicant: Elecom Co., Ltd., Osaka City (JP)

(72) Inventors: Atsuki Tabeta, Osaka (JP); Kiyotaka Hirata, Osaka (JP)

(73) Assignee: Elecom Co., Ltd., Osaka City (JP)

( * ) Notice: Subject to any disclaimer, the term of this patent is extended or adjusted under 35 U.S.C. 154(b) by 0 days.

(21) Appl. No.: 18/919,485

(22) Filed: Oct. 18, 2024

(65) Prior Publication Data

US 2025/0138656 A1 May 1, 2025

(30) Foreign Application Priority Data

Oct. 25, 2023 (JP) ................................. 2023-183004

(51) Int. Cl.
*G06F 3/0354* (2013.01)

(52) U.S. Cl.
CPC ................................ *G06F 3/03549* (2013.01)

(58) Field of Classification Search
CPC ......................... G06F 3/03549; G06F 3/03541
See application file for complete search history.

(56) References Cited

U.S. PATENT DOCUMENTS

| | | | |
|---|---|---|---|
| 5,543,821 A | 8/1996 | Marchis et al. | |
| 5,926,167 A | 7/1999 | Niitsuma et al. | |
| 2020/0340646 A1* | 10/2020 | Harpenau | F21S 8/026 |
| 2022/0382394 A1* | 12/2022 | Wang | A61B 8/467 |

FOREIGN PATENT DOCUMENTS

| | | |
|---|---|---|
| JP | H0517732 U | 3/1993 |
| JP | 2001265527 A | 9/2001 |
| JP | 2006215788 A | 8/2006 |
| JP | 3129083 U | 2/2007 |
| JP | 2013061855 A | 4/2013 |

OTHER PUBLICATIONS

"Expert Mouse ball roller-ization is the idle talk", YouTube, Jul. 16, 2022, 1:13:08-1:14: 14, https://www.youtube.com/watch?v=fV0 BYZE cyQ v, May 9, 2024 search.

* cited by examiner

*Primary Examiner* — Hang Lin

(74) *Attorney, Agent, or Firm* — The Webb Law Firm

(57) ABSTRACT

Provided is a mouse including: a ball body; and a mouse body including a receiving part in which the ball body having a spherical shape is rollably received. The receiving part includes: a receiving recess part opening outward and formed to be recessed inward to receive the ball body therein; and a support member disposed on the receiving recess part for supporting the ball body received in the receiving recess part, and the support member is configured to be attachable to and detachable from the receiving recess part.

4 Claims, 16 Drawing Sheets

MOUSE AND REPLACEMENT SUPPORT KIT

CROSS-REFERENCE TO RELATED APPLICATION

This application claims priority to Japanese Patent Application No. 2023-183004 filed Oct. 25, 2023, the disclosure of which is hereby incorporated by reference in its entirety.

BACKGROUND OF THE INVENTION

Field of the Invention

The present disclosure relates to a mouse for use as a peripheral equipment of a personal computer, and a replacement support kit used for the mouse.

Description of Related Art

Conventionally known is a mouse for use as a peripheral equipment of a personal computer (see JP 2006-215788 A). As shown in FIG. 12, a mouse 900 includes: a box-shaped case 901 with its upper part opening; a pair of bearings 905 and 906 disposed on a bottom part of the case 901; first and second detection shafts 903 and 904 rotatably disposed via the bearings 905 and 906 respectively; and a ball bearing 911 rotatably disposed in a corner part of the case 901. The mouse 900 further includes: a ball 912 rotatably mounted on the detection shafts 903 and 904 and the ball bearing 911; a cover 913 disposed on the upper part of the case 901; and an electronic circuit board 915.

The bearings 905 and 906 are provided respectively with first and second rotation detectors 907 and 908, such as photosensors or encoders, disposed on one ends respectively of the detection shafts 903 and 904. The first and second rotation detectors 907 and 908 are configured to output an X-axis output and a Y-axis output, which are coordinate input signals to be input to a display of a computer or the like, to the electronic circuit board 915. The electronic circuit board 915 is configured to output the X-axis output and the Y-axis output from the respective rotation detectors 907 and 908 to the computer.

In this mouse 900, the ball 912 is rotated to thereby rotate the detection shafts 903 and 904 in conjunction therewith. The ball 912 is disposed to be partially exposed upward from the upper part of the case 901. Further, the cover 913 is configured to prevent the ball 912 from popping out of the case 901. In this mouse 900, when the ball 912 is rotated, the rotation detectors 907 and 908 respectively of the detection shafts 903 and 904 rotate in conjunction with the rotation of the ball 912, to output the X-axis output and the Y-axis output.

The above mouse needs to be replaced by a newly purchased one once the detection shafts or the ball bearing for supporting the ball is damaged or worn out, which is not cost effective.

SUMMARY OF THE INVENTION

It is an object of the present disclosure to provide a cost-effective mouse and replacement support kit.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A mouse of the present disclosure includes: a ball body having a spherical shape; and a mouse body including a receiving part in which the ball body having the spherical shape is rollably received, the receiving part including: a receiving recess part opening outward and formed to be recessed inward to receive the ball body therein; and a support member disposed on the receiving recess part for supporting the ball body received in the receiving recess part, in which the support member is configured to be attachable to and detachable from the receiving recess part.

The mouse can further be configured such that the receiving recess part includes a support attaching part to which the support member is detachably attached, and the support member includes: a base part attachable to and detachable from the support attaching part; and a support part disposed on the base part for supporting the ball body received in the receiving recess part.

The mouse can further be configured such that the support attaching part includes an attaching recess formed to be recessed within the receiving recess part, and the support member is made to be attachable to or detachable from the support attaching part by allowing the base part to be fitted in or removed from the attaching recess.

A replacement support kit according to the present disclosure is a replacement support kit used for a mouse including: a mouse body configured to allow an input operation to a computer and including a receiving recess part formed to be recessed inward; and a ball body having a spherical shape and rollably received in the receiving recess part, the replacement support kit including a support member configured to be attachable to and detachable from an inside of the receiving recess part for supporting the ball body received in the receiving recess part.

The replacement support kit can further include a detaching jig used for removing the support member from the receiving recess part by being locked to the support member attached to the receiving recess part.

Effect of the Invention

As described above, according to the present disclosure, a mouse and a replacement support kit which are cost effective can be provided.

DETAILED DESCRIPTION OF THE INVENTION

A description will be hereinafter given on a mouse according to an embodiment of the present disclosure with reference to FIG. 1 to FIG. 11. The mouse 1 is a type of pointing device. The mouse 1 is used as a peripheral equipment of a computer (not shown) while being placed on, for example, a desk. In this embodiment, the mouse 1 is connected to the computer via Bluetooth (registered trademark), thereby being capable of operating what is presented on a display. The mouse 1 can be connected to the computer via a 2.4 GHz wireless signal or a cable.

Figure 1:
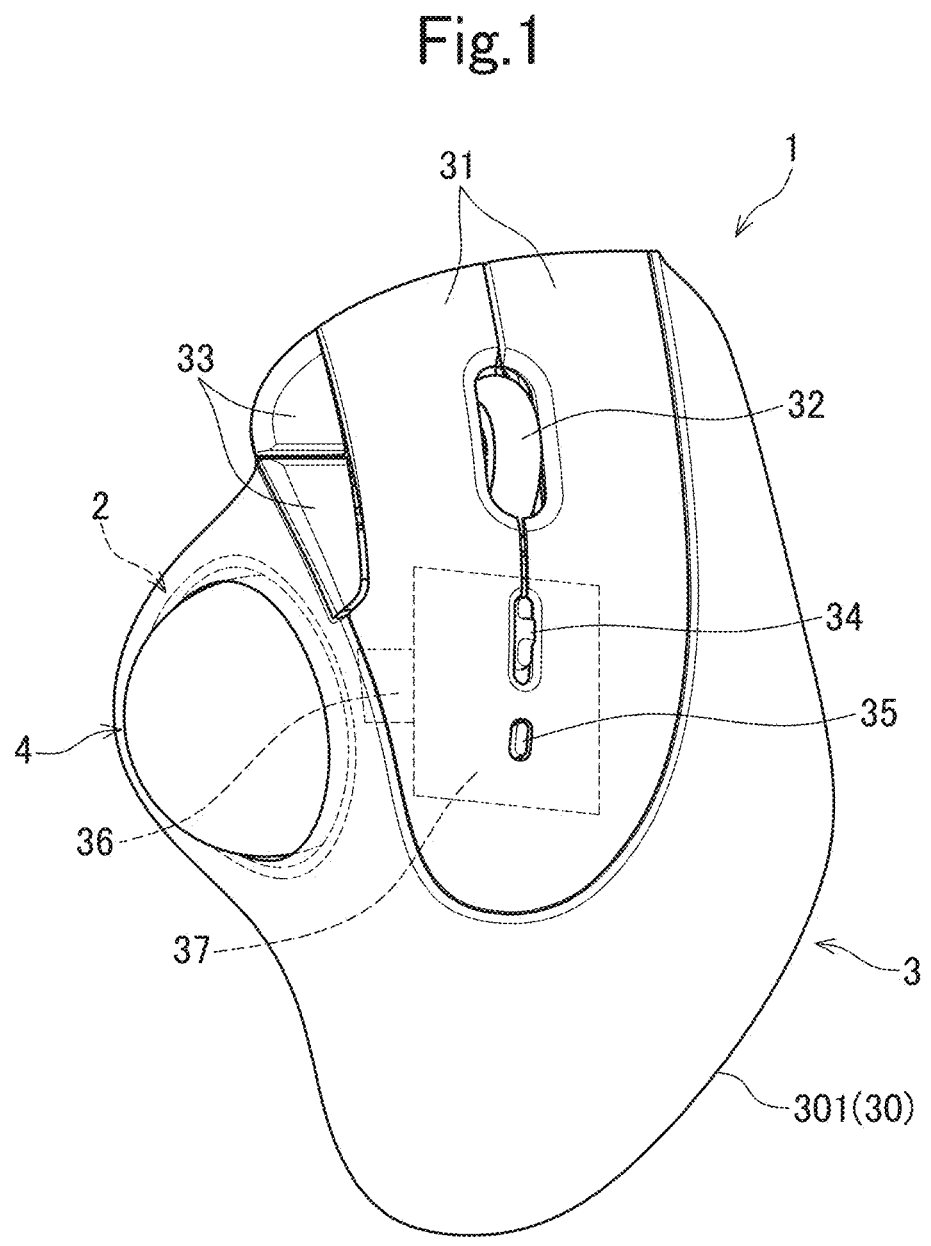
FIG. 1 is a top view of a mouse according to this embodiment.

As shown in FIG. 1, the mouse 1 is configured to allow an input operation to a computer. The mouse 1 also includes a ball body 4 having a spherical shape, and a mouse body 3 including a receiving part 2 in which the ball body 4 having the spherical shape is rollably received. The mouse 1 is a trackball mouse capable of being operated by a user when his or her thumb touches the ball body 4, but can be a trackball mouse capable of being operated when his or her index finger touches the ball body 4. The mouse 1 can also be a mouse capable of being operated when the ball body 4 rolls on, for example, a desk.

The ball body 4 is used to control a position of a pointer on the display connected to the computer. The ball body 4 is a spherical body configured to be rotated with the user's finger for operation. In this embodiment, the ball body 4 is disposed on a left side of the mouse body 3. Further, the ball body 4 is supported by the receiving part 2 while a portion of the ball body 4 corresponding to substantially half of its diameter is located within the receiving part 2. The diameter of the ball body 4 is, for example, 36 mm, but can be 34 mm or another diameter.

The mouse body 3 includes, in addition to the receiving part 2 formed to be recessed inward, a case 30 disposed on a right side of the receiving part 2. The mouse body 3 further includes two main operation keys 31 and a wheel 32, which are disposed in the case 30. The mouse body 3 further includes two browsing operation keys 33, a speed setting key 34, and a power switch 35, which are disposed in the case 30. The mouse body 3 still further includes a sensor unit 36 configured to detect the rotation of the ball body 4, and a circuit board 37 connected to the sensor unit 36.

Figure 2:
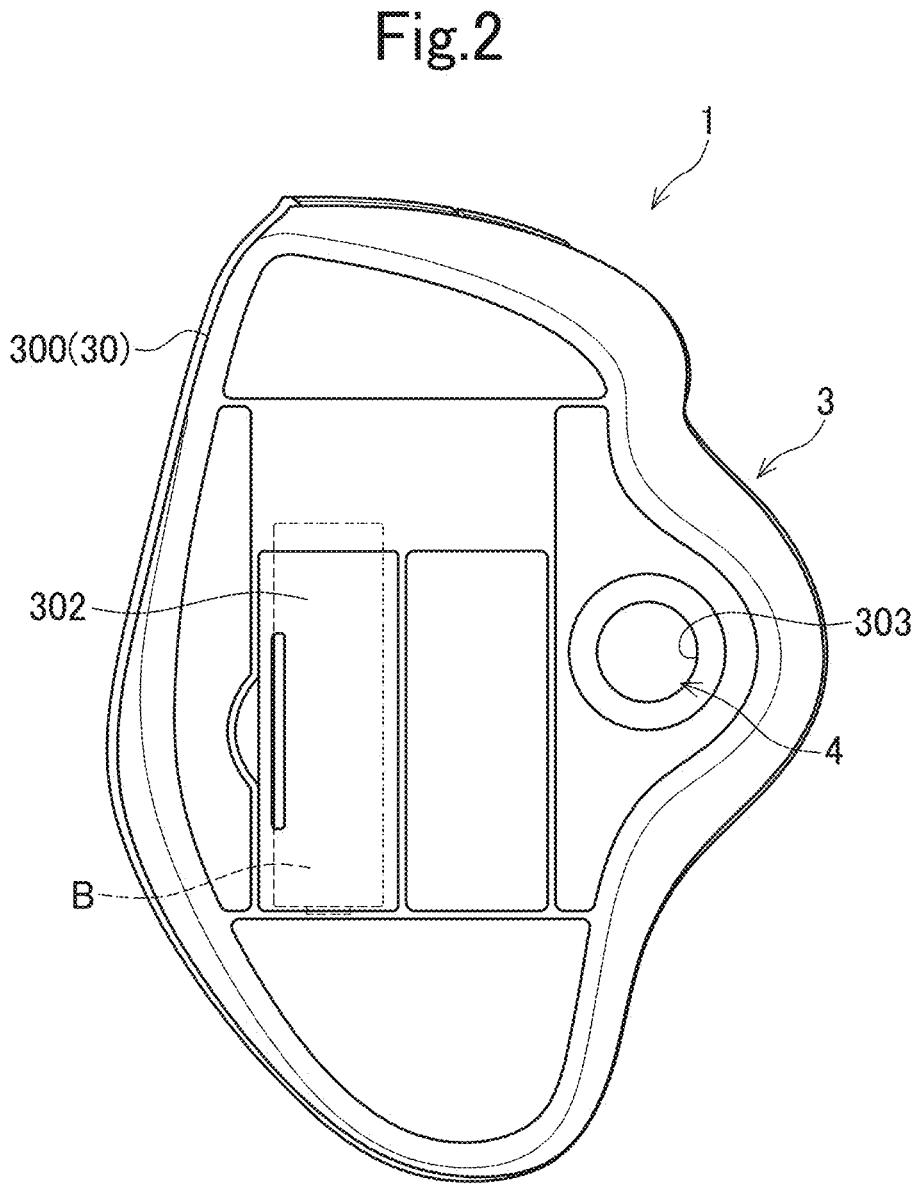
FIG. 2 is a bottom view of the mouse.

The case 30 includes a case bottom 300, shown in FIG. 2, having a flat shape and to be placed on, for example, a desk, and a case top 301, shown in FIG. 1, having a bowl shape and disposed on the case bottom 300. A battery B serving as a power source for the mouse 1 is housed within the case 30 (see FIG. 2).

The case bottom 300 includes a cover 302 openable and closable when the battery B is put in and taken out. Further, the case bottom 300 has a case ejection hole 303 through which the ball body 4 can be ejected.

The two main operation keys 31 are arranged next to each other right and left (see FIG. 1). One of the main operation keys 31 located on the left side is a key for a left click. The other main operation key 31 located on the right side is a key for a right click.

The wheel 32 is a wheel for a scroll operation. The wheel 32 is formed in a disk shape. Further, the wheel 32 is made rotatable about its axial center, and is disposed to partially project from the case top 301.

The two browsing operation keys 33 are arranged next to each other back and forth (i.e., on a side farther from the user and a side closer to the user, respectively) on the left side of the main operation key 31 located on the left side. The browsing operation key 33 located on the front side is a key for moving forward to a newer page in the browsing history (i.e., corresponding to "forward" in a web browser). The browsing operation key 33 located on the back side is a key for moving back to an older page in the browsing history (i.e., corresponding to "back" key in a web browser).

The speed setting key 34 is a key for setting a speed of the pointer on the display. In this embodiment, the speed setting key 34 is an operation piece switchable to any one of three speed setting selection positions: low speed, medium speed, and high speed.

The power switch 35 is a switch for turning on or off the mouse 1.

The sensor unit 36 includes, for example, an optical sensor, a lens, and a sensor board, for detecting an amount of rotation of the ball body 4. The sensor board of the sensor unit 36 is electrically connected to the circuit board 37.

The circuit board 37 is configured to output a signal to the computer to move the pointer on the display in accordance with the amount of rotation of the ball body 4 detected by the sensor unit 36.

Figure 3:
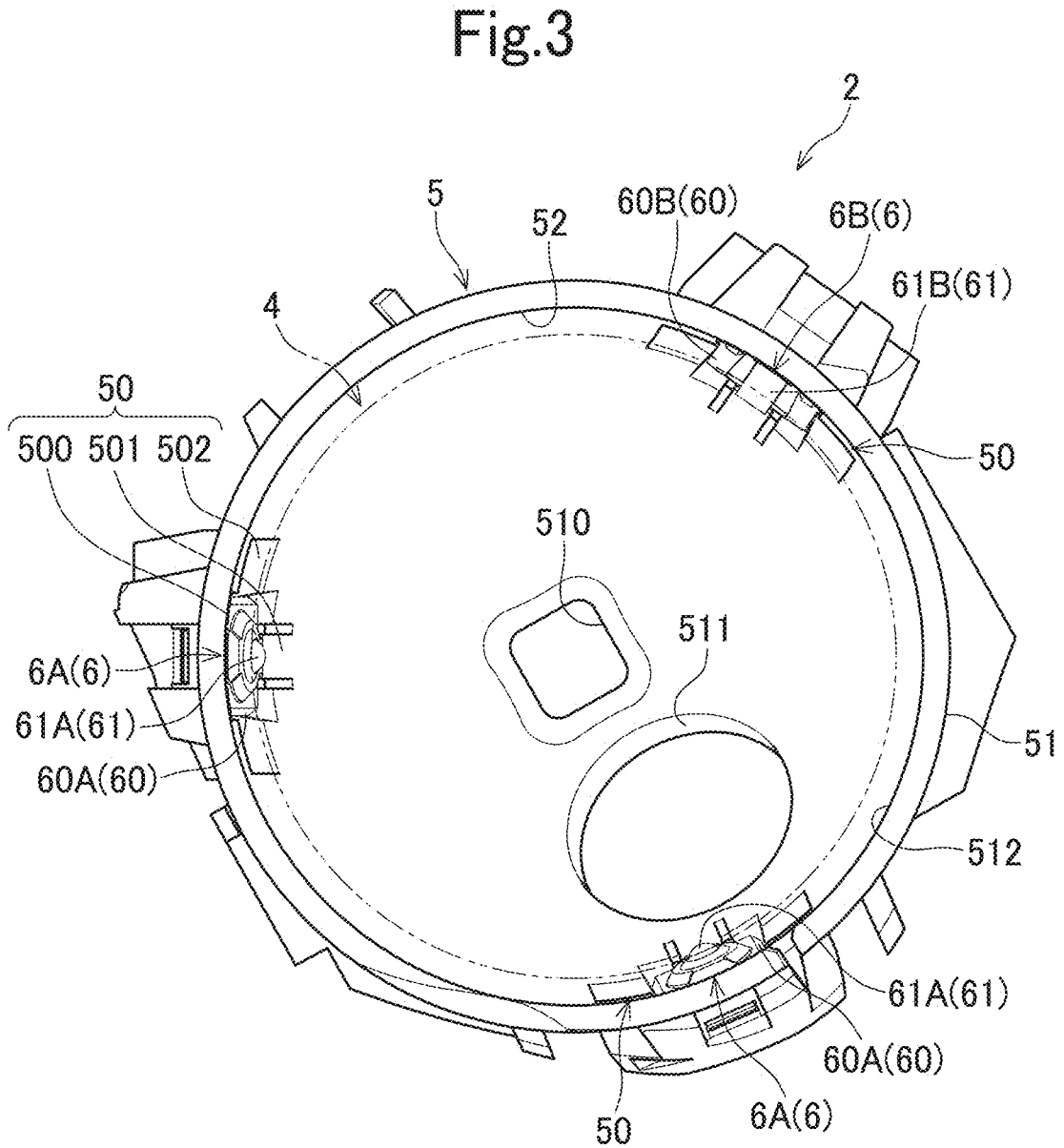
FIG. 3 is a view showing how a ball body is arranged in a receiving part of the mouse.

The receiving part 2 rotatably supports the ball body 4 with a part of the ball body 4 exposed therefrom. As shown in FIG. 3, the receiving part 2 includes a receiving recess part 5 opening outward and formed to be recessed inward to receive the ball body 4 therein, and a support member 6 disposed on the receiving recess part 5 for supporting the ball body 4 received in the receiving recess part 5. The mouse 1 includes three support members 6. The mouse 1 can include only one support member 6, only two support members 6, or four or more support members 6.

The receiving recess part 5 is a substantially hemispherical body on which the ball body 4 is mounted. Outward of the receiving recess part 5 is the sensor unit 36 shown in FIG. 1 disposed. The receiving recess part 5 has a diameter larger than the diameter of the ball body 4. In this embodiment, the receiving recess part 5 is disposed to have an inner surface 52 of the receiving recess part 5 downwardly inclined toward the left side and the front side (i.e., the side closer to the user).

The receiving recess part 5 includes a support attaching part 50 to which the support member 6 is detachably attached. The receiving recess part 5 also includes a recessed surface part 51 that partially covers the ball body 4 from a bottom side. The configuration of the receiving recess part 5 will be described later.

Figure 11:
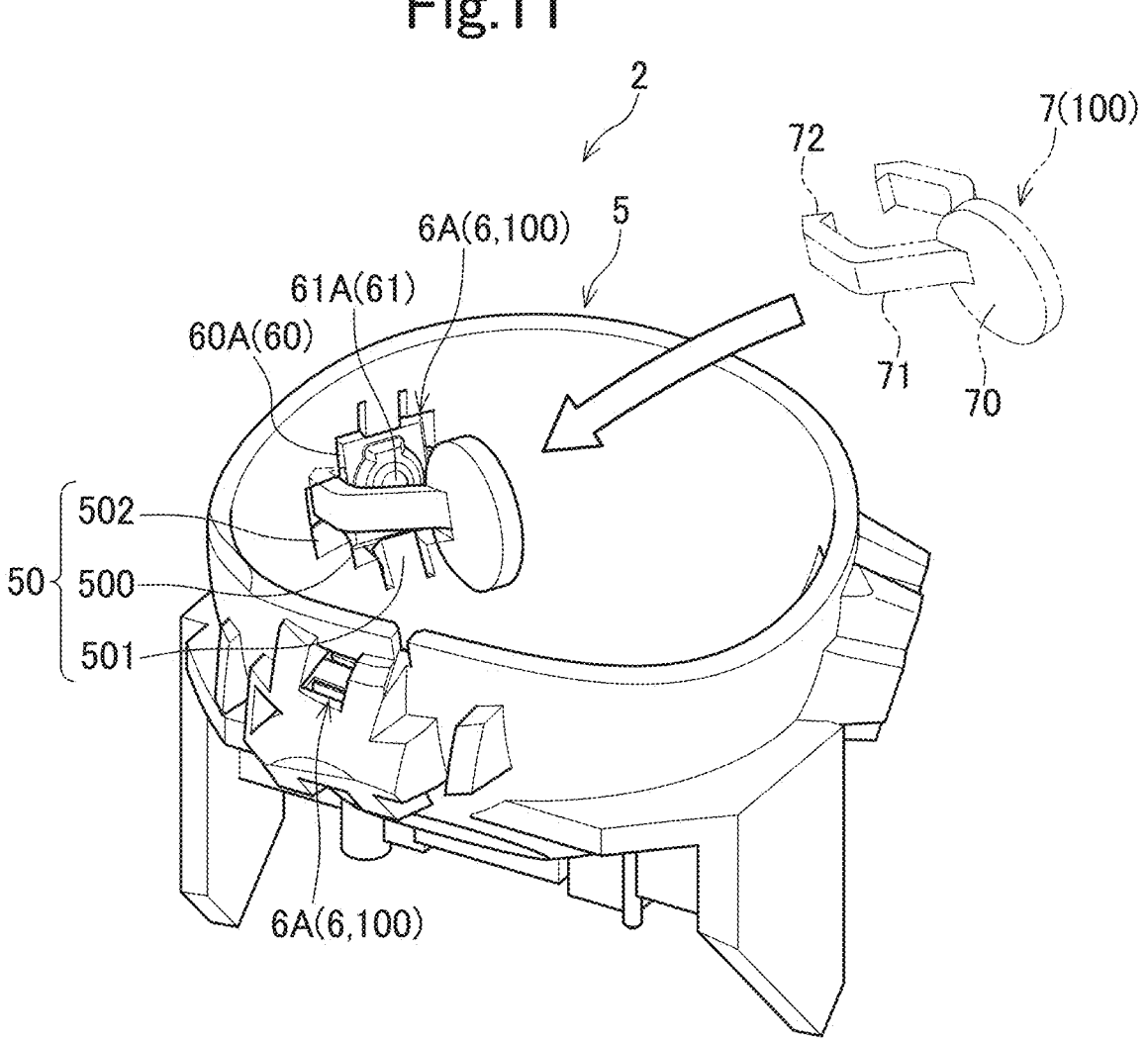
FIG. 11 is a view showing removal of the support member from a receiving recess part of the receiving part.
Figure 12:
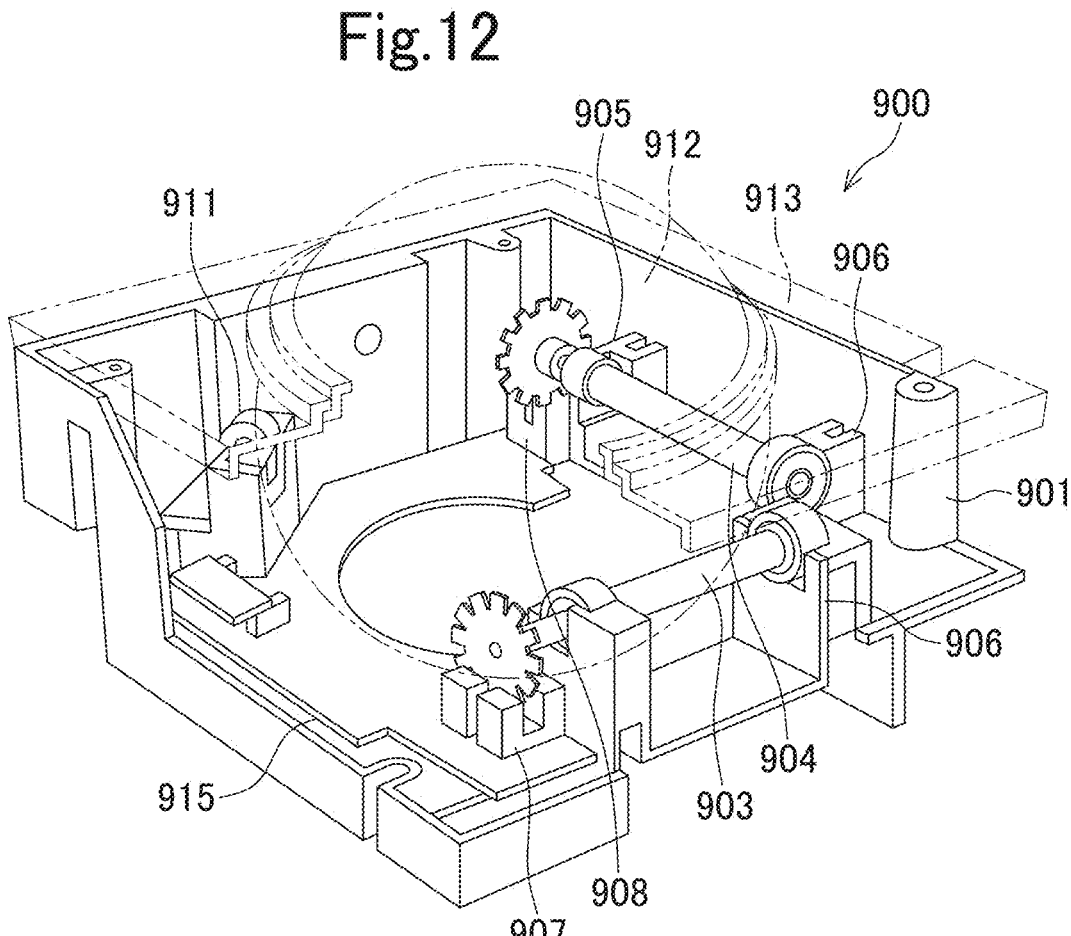
FIG. 12 is a perspective view of a conventional mouse that has been partially cut out.

The support member 6 is configured to be attachable to and detachable from the receiving recess part 5. In this embodiment, as shown in FIG. 11, the support member 6 is detachable from the receiving recess part 5 using a detaching jig 7. This detaching jig 7 is, for example, a pair of tweezers for holding the support member 6 from both sides. The support member 6 can be attached to the receiving recess part 5 using the user's fingers.

The detaching jig 7 includes, for example, a holding part 70 to be held by the user with his or her fingers, a pair of first extension parts 71 extending from the holding part 70, and a pair of second extension parts 72 extending from extension ends of the respective pair of first extension parts 71. Each of the first extension parts 71 is bent at an intermediate position in a direction in which the first extension part 71 extends, but can extend linearly. The pair of second extension parts 72 extend in directions approaching each other. Each of the second extension parts 72 has a tapered shape having a distal end smaller than a proximal end.

Figure 4:
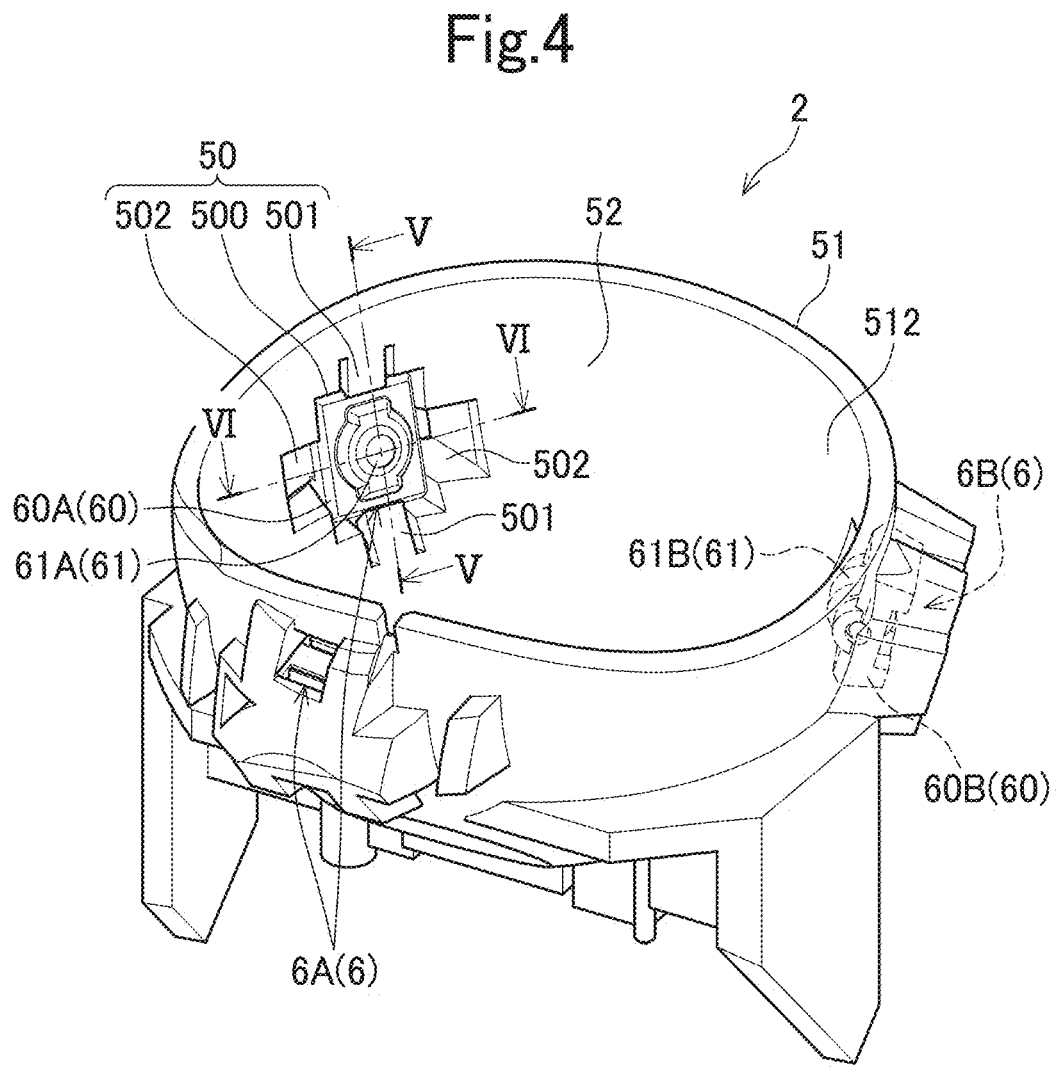
FIG. 4 is a perspective view of the receiving part.

In this embodiment, the support member 6 includes a base part 60 attachable to and detachable from the support attaching part 50, and a support part 61 disposed on the base part 60 for supporting the ball body 4 in the receiving recess part 5 (see FIG. 4). The support member 6 is formed by combining the base part 60 and the support part 61 produced separately. In this support member 6, the support part 61 is fixed to the base part 60, and the user cannot remove the support part 61 from the base part 60. The base part 60 and the support part 61 can be formed by integrated molding (e.g., integrated resin molding).

The support part 61 supports the ball body 4 by coming into contact with the ball body 4 (see FIG. 3). In this embodiment, three support parts 61 support the ball body 4 by coming into contact with the ball body 4. Each of the support parts 61 projects inward from the inner surface 52 of the receiving recess part 5.

The support part 61 is a spherical body or a circular columnar body. As the spherical body, for example, an artificial ruby ball or a ceramic ball is used. The spherical body can be rollably fixed to the base part 60, or can be unrollably fixed to the base part 60. As the circular columnar body, a bearing or a roller is used. The circular columnar body is rollably fixed to the base part 60.

For example, the support part 61 includes an artificial ruby ball 61A as an unrollable spherical body unrollably fixed to the base part 60, and a bearing 61B as a rollable circular columnar body rollably fixed to the base part 60. The support part 61 in this embodiment includes two different types of support parts 61A and 61B, but the support part 61 can include three or more types of support parts or can include only one type of support part. In this mouse 1, the ball body 4 is supported by two artificial ruby balls 61A and one bearing 61B.

Figure 5:
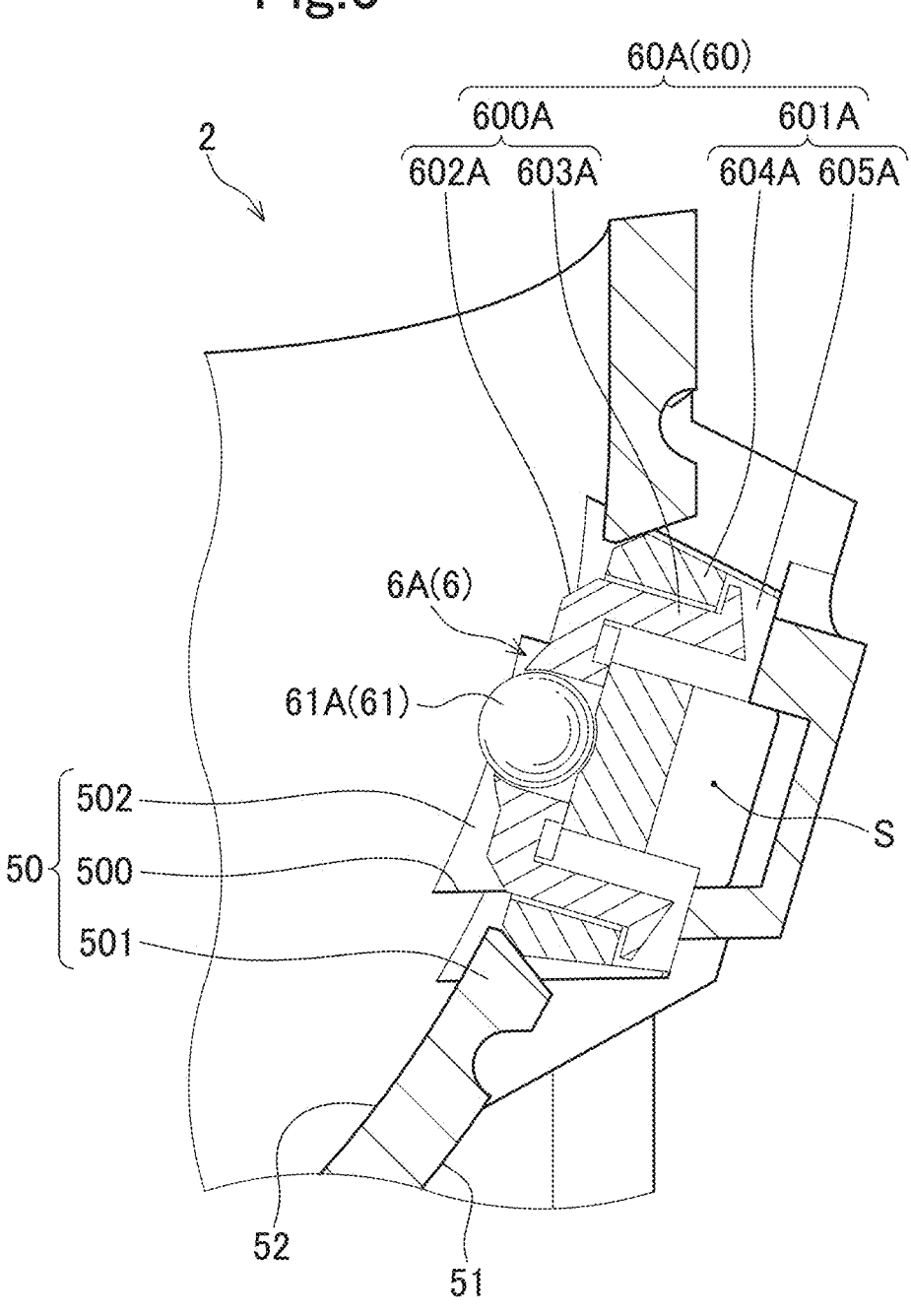
FIG. 5 is a cross-sectional view taken along line V-V in FIG. 4.
Figure 6:
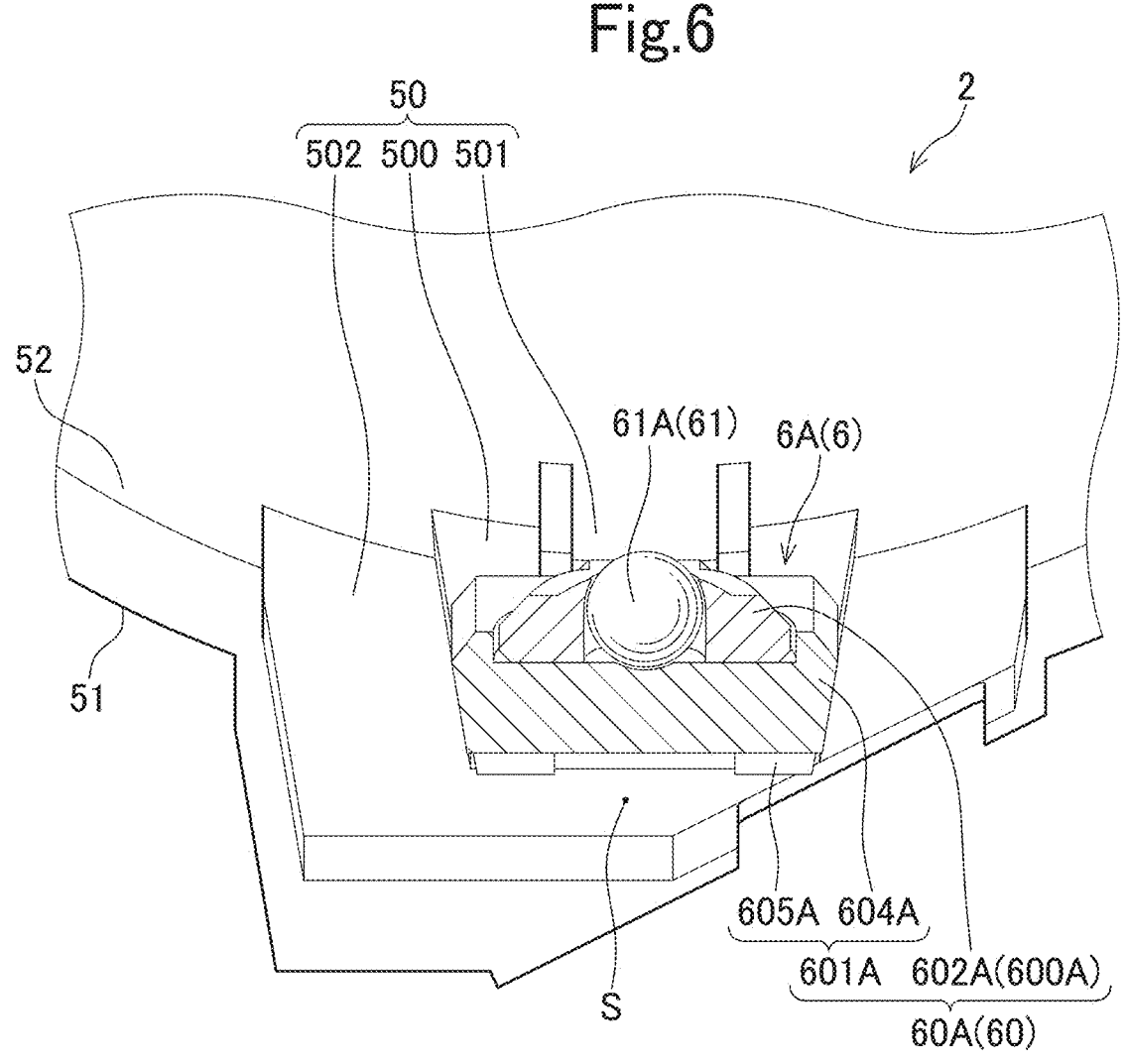
FIG. 6 is a cross-sectional view taken along line VI-VI in FIG. 4.

The base part 60 supports the support part 61 and is attached to the support attaching part 50. The base part 60 further includes a first base part 60A supporting the artificial ruby ball 61A, and a second base part 60B supporting the bearing 61B. In this embodiment, as shown in FIG. 5 and FIG. 6, a large portion of the base part 60 is located outward of the inner surface 52 of the receiving recess part 5.

Figure 7A:
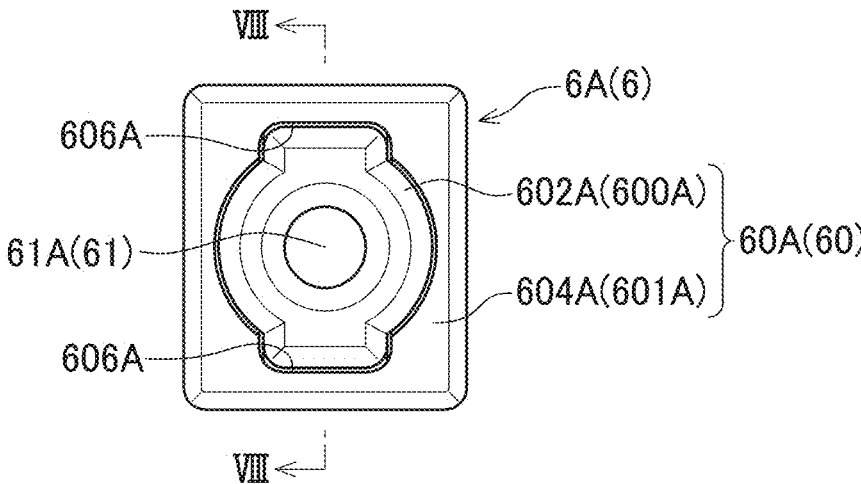
FIG. 7A is a front view showing a configuration that a support part of a support member in the receiving part is a ruby ball.
Figure 7B:
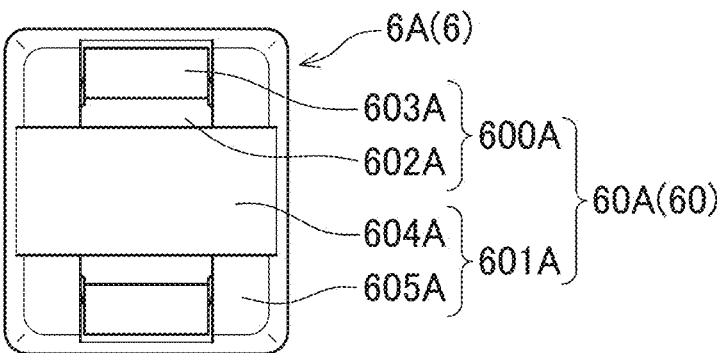
FIG. 7B is a rear view showing the configuration that the support part of the support member in the receiving part is the ruby ball.
Figure 7C:
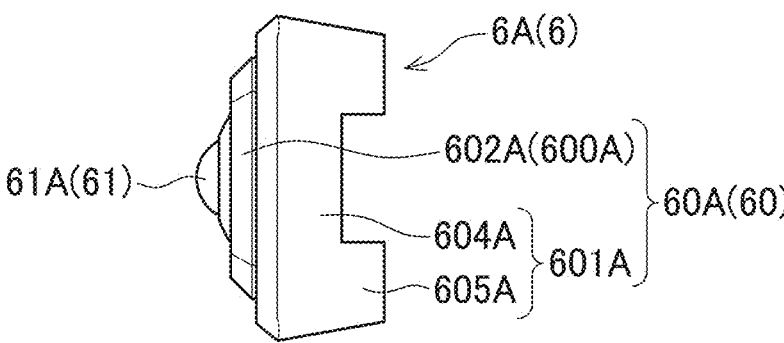
FIG. 7C is a side view showing the configuration that the support part of the support member in the receiving part is the ruby ball.
Figure 8:
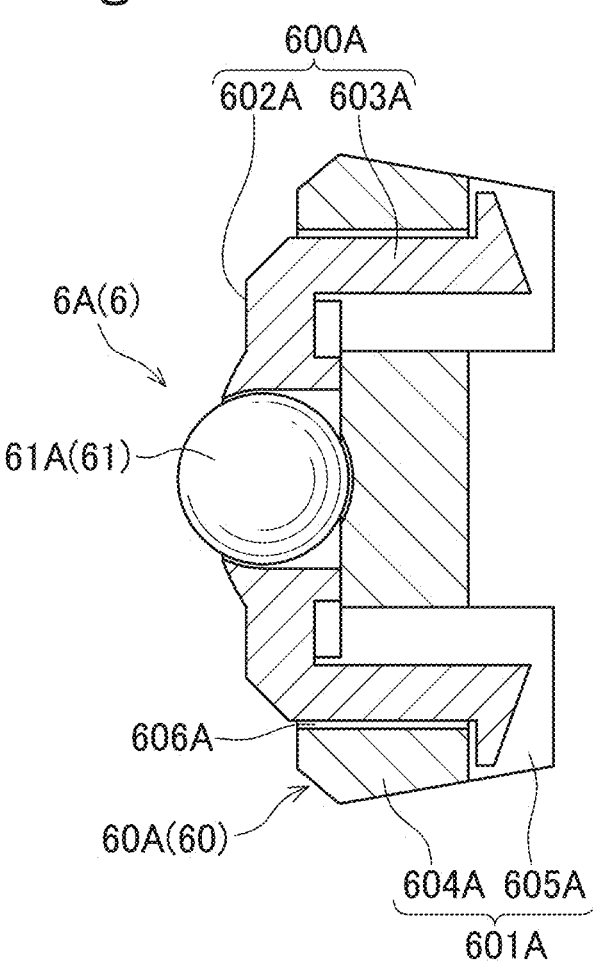
FIG. 8 is a cross-sectional view taken along line VIII-VIII in FIG. 7A.

As shown in FIG. 7A and FIG. 7B, the first base part 60A includes a placement part 600A on which the artificial ruby ball 61A is placed, and a first mount part 601A supporting the placement part 600A. The placement part 600A includes an annular part 602A having an annular shape and on which the artificial ruby ball 61A is placed, and a pair of placement legs 603A respectively extending from two positions on a peripheral edge of the annular part 602 with its central point located therebetween. As shown in FIG. 7B and FIG. 7C, the first mount part 601A includes a square plate part 604A with its central portion recessed to allow the annular part 602A to be placed thereon, and four first mount legs 605A respectively extending from four corners of the plate part 604A. The plate part 604A has a pair of through holes 606A with the center of the plate part 604A located therebetween (see FIG. 7A). As shown in FIG. 8, the placement legs 603A of the placement part 600A are inserted into the respective through holes 606A in the first mount part 601A to thereby fix the placement part 600A to the first mount part 601A. In this embodiment, a portion of the base part 60 except the annular part 602A is located outward of the inner surface 52 of the receiving recess part 5 (see FIG. 5 and FIG. 6).

Figure 9A:
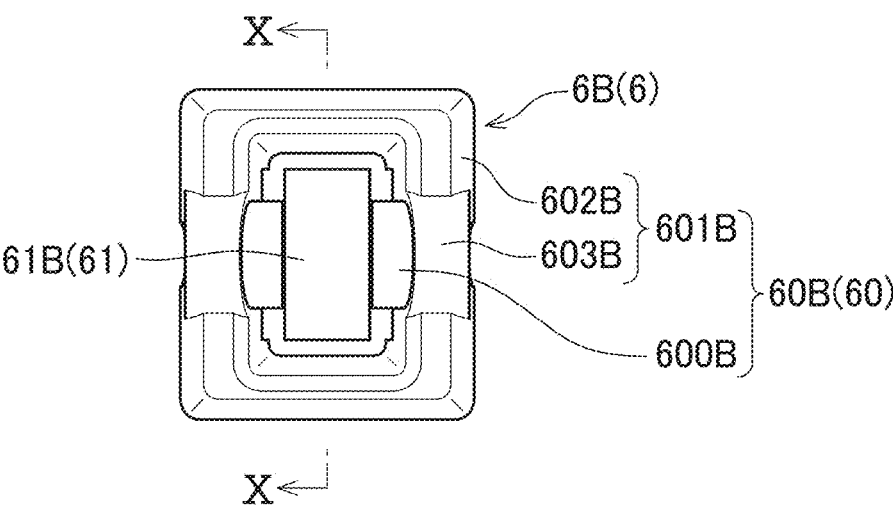
FIG. 9A is a front view showing a configuration that the support part of the support member is a bearing.
Figure 9B:
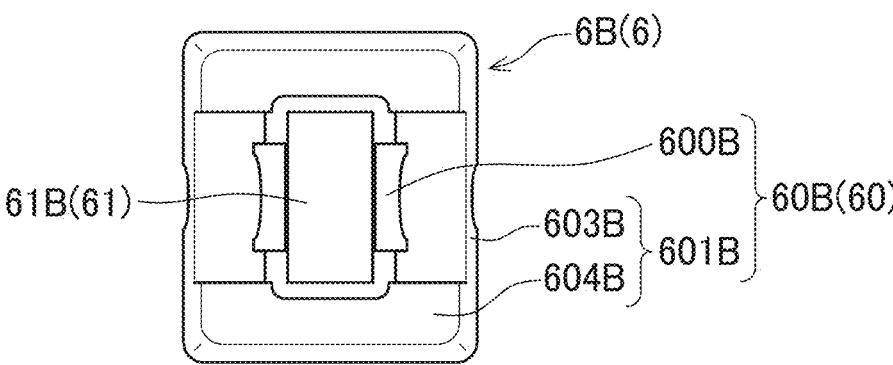
FIG. 9B is a rear view showing the configuration that the support part of the support member is the bearing.
Figure 9C:
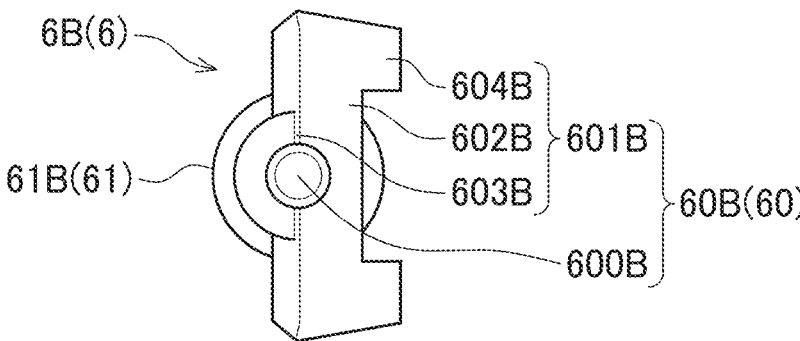
FIG. 9C is a side view showing the configuration that the support part of the support member is the bearing.
Figure 10:
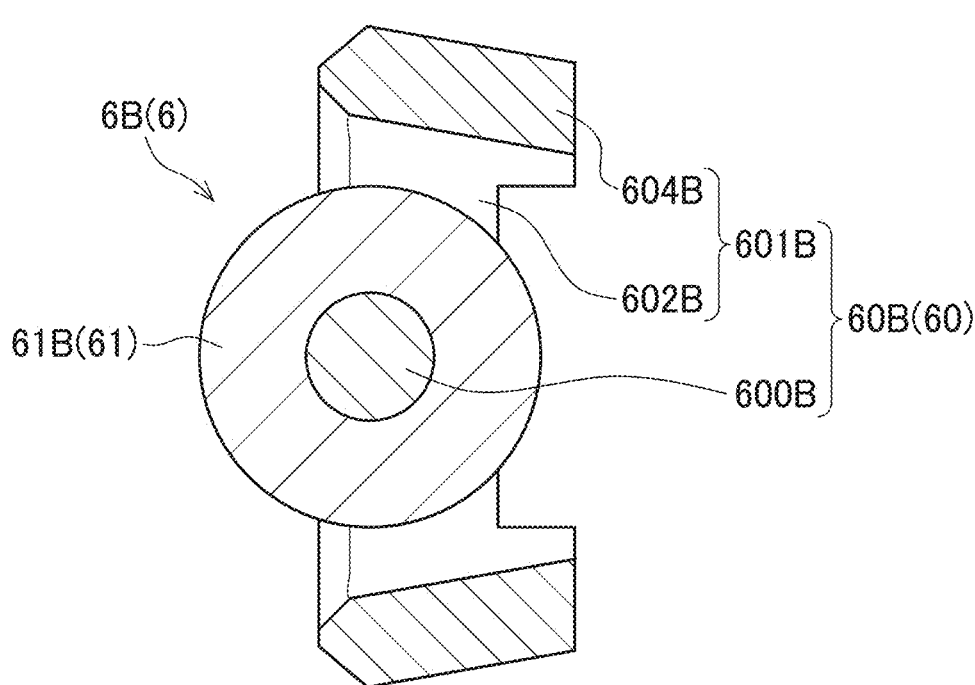
FIG. 10 is a cross-sectional view taken along line X-X in FIG. 9A.

As shown in FIG. 9A and FIG. 9B, the second base part 60B includes a shaft part 600B to which the one bearing 61B is attached, and a second mount part 601B supporting the shaft part 600B. The second mount part 601B includes a frame part 602B having a square annular shape, and a pair of shaft connecting parts 603B disposed respectively on one of two pairs of opposing sides of the frame part 602B and to which the shaft part 600B is connected. The second mount part 601B further includes a pair of second mount legs 604B extending respectively from the other pair of opposing sides of the frame part 602B. As shown in FIG. 9C and FIG. 10, the shaft part 600B is connected to the shaft connecting part 603B of the second mount part 601B to be thereby fixed to the second mount part 601B.

The recessed surface part 51 of the receiving recess part 5 functions to hide the circuit board 37 or the battery B when the user removes the ball body 4 from the receiving recess part 5 (see FIG. 3). In this embodiment, the recessed surface part 51 has an opening 510 to have the sensor unit 36 shown in FIG. 1 exposed therefrom. The recessed surface part 51 has a recessed part ejection hole 511 at a position overlapping the case ejection hole 303 shown in FIG. 1. The inner surface of the recessed surface part 51 is a recessed surface 512 having a shape conforming to a hemisphere.

One support member 6 is attached to each support attaching part 50. In this embodiment, three support attaching parts 50 are disposed. The three support attaching parts 50 are arranged annularly on the recessed surface 512 of the recessed surface part 51. The three support attaching parts 50 are arranged at equal intervals from each other in a direction in which the support attaching parts 50 are arranged.

As shown in FIG. 4, each of the support attaching parts 50 has an attaching recess 500 formed to be recessed within the receiving recess part 5. The support attaching part 50 includes a locking part 501 configured to be locked to the support member 6 attached to the attaching recess 500. Further, the support attaching part 50 has an insertion hole 502 into which the detaching jig 7 shown in FIG. 11 is inserted when the support member 6 is detached from the attaching recess 500.

The attaching recess 500 is a portion in which the base part 60 of the support member 6 fits. The attaching recess 500 is a recessed part that is recessed in the recessed surface part 51 in a thickness direction of the recessed surface part 51. In this embodiment, the attaching recess 500 is a recessed part having a quadrangular shape when viewed from the thickness direction of the recessed surface part 51. The shape of the attaching recess 500 when viewed from the thickness direction of the recessed surface part 51 can be any shape as long as it conforms to the shape of the base part 60 of the support member 6.

The locking part 501 is a locking piece for holding the base part 60 fitted in the attaching recess 500 from inward of the recessed surface part 51. The locking part 501 is locked to an end part of the base part 60 of the support member 6.

In this embodiment, as shown in FIG. 5, a pair of the locking parts 501 are disposed to be locked respectively to one end part and an other end part of the base part 60 of the support member 6. That is, the support member 6 has a pair of locked parts to which the respective locking parts 501 are locked in the one end part and the other end part of the base part 60 of the support member 6. Specifically, the locking parts 501 are locked respectively to one end part and an other end part of the plate part 604A of a support member 6A. That is, the support member 6A includes the pair of locked parts to which the respective locking parts 501 are locked in both end parts of the plate part 604.

Similar to those of the support member 6A, the locking parts 501 of a support member 6B are also locked to one end part and an other end part of a frame part 602B of a base part 60B of the support member 6B. That is, the support member 6B has a pair of locked parts to which the locking parts 501 are respectively locked in the one end part and the other end part of the frame part 602B.

The pair of locking parts 501 are disposed to have the attaching recess 500 sandwiched therebetween. Specifically, the pair of locking parts 501 extend respectively from opposing positions on a peripheral edge of the attaching recess 500 toward the support part 61 within the attaching recess 500. These locking parts 501 are each made of such a material or formed to have such a thickness as to be bent with force applied by the user when he or she pulls the support member 6 out of the attaching recess 500 or when he or she pushes the support member 6 into the attaching recess 500.

The insertion hole 502 is formed to be continuous with the attaching recess 500. The insertion hole 502 includes a pair of insertion holes 502 formed to allow the pair of first extension parts 71 and the pair of second extension parts 72 of tweezers 7 as the detaching jig 7 to be respectively inserted thereinto and to allow the inserted portions of the tweezers 7 to be locked to the base part 60 of the support member 6 (see FIG. 4). That is, the support member 6 includes a pair of locked parts to which the portions of the tweezers 7 inserted into the insertion holes 502 are to be locked, in one end part and an other end part of the base part 60. Specifically, the portions of the tweezers 7 inserted into the insertion holes 502 are respectively locked to one end part and an other end part, which are not the end parts to which with the locking parts 501 are locked, of the plate part 604A of the support member 6A. That is, the support member 6A includes a pair of locked parts to which the portions of the tweezers 7 inserted into the insertion holes 502 are to be locked, in the one end part and the other end part of the plate part 604, which are not the end parts to which the locking parts 501 are to be locked.

Similar to the case of the support member 6A, the portions of the tweezers 7 inserted into the insertion holes 502 are also locked respectively to one end part and an other end part, which are not the end parts to which the locking parts 501 are locked, of the frame part 602B of the base part 60B of the support member 6B. That is, the support member 6B includes a pair of locked parts to which the portions of the tweezers 7 inserted into the insertion holes 502 are locked, in the one end part and the other end part of the frame part 602B, which are not the end parts to which the locking parts 501 are locked.

The pair of insertion holes 502 are disposed to have the attaching recess 500 sandwiched therebetween. Specifically, the pair of insertion holes 502 extend respectively from opposing positions on those portions of the peripheral edge of the attaching recess 500 which have no locking parts 501 located, in a direction away from the attaching recess 500. The pair of insertion holes 502 in this embodiment are disposed to have the attaching recess 500 sandwiched therebetween in the direction in which the support attaching parts 50 are arranged, but the pair of insertion holes 502 can be disposed to have the attaching recess 500 sandwiched therebetween in a direction different from the direction in which the support attaching parts 50 are arranged. The insertion holes 502 are formed to have such a size as to allow the pair of first extension parts 71 and the pair of second extension parts 72 of the tweezers 7 to be inserted thereinto.

The insertion holes 502 are each partially formed between a peripheral surface of the base part 60 of the support member 6 and a portion of the recessed surface part 51 opposed to the peripheral surface of the base part 60. In this embodiment, as shown in FIG. 6, a space S for allowing the detaching jig 7 to be inserted thereinto is formed continuously with the insertion holes 502 between the base part 60 and the support attaching part 50. Specifically, the space S extends continuously between the pair of insertion holes 502. The space S is located outward of those portions of the support member 6 located outward of the base part 60 (e.g., first mount legs 605A or second mount legs 604B).

Further, in this embodiment, the support member 6 is made attachable to or detachable from the support attaching part 50 by allowing the base part 60 to be fitted in or removed from the attaching recess 500. Hereinafter, a description will be given on removing the support member 6 from the support attaching part 50 and attaching the support member 6 to the support attaching part 50 in this order.

To remove the support member 6 from the support attaching part 50, the user first inserts his or her finger into the case ejection hole 303 and the recessed part ejection hole 511 of the receiving recess part 5 from the bottom side of the case 30, and pushes the ball body 4 to remove it from the receiving recess part 5 (see FIG. 2 and FIG. 3). In the state where the support member 6 is attached to the support attaching part 50, the base part 60 as the locking part of the support member 6 fits in the attaching recess 500 as the locked part of the support attaching part 50 (see FIG. 11).

Thereafter, the user inserts the detaching jig 7 into the insertion holes 502 of the support attaching part 50. This allows the first extension parts 71 and the second extension parts 72 of the detaching jig 7 to be located in the respective insertion holes 502. In this embodiment, the user further inserts the detaching jig 7 located in the insertion holes 502 into the space S between the base part 60 and the support attaching part 50 (see FIG. 6). This allows the second extension parts 72 of the detaching jig 7 to be located in the space S. At this time, the first extension parts 71 as the locking parts of the detaching jig 7 are locked to the peripheral surface of the base part 60 as the locked parts. Further, the second extension parts 72 as the locking parts of the detaching jig 7 are locked to a bottom surface of the base part 60 as the locked parts.

The detaching jig 7 locked in this state is pulled inward of the receiving recess part 5 to thereby apply force directed inward of the receiving recess part 5 to the support member 6 while the second extension parts 72 of the detaching jig 7 are held hooked to the bottom surface of the base part 60 of the support member 6. In this embodiment, inward force applied to the support member 6 causes the locking parts 501 of the support attaching part 50 to be subjected to inward force from a portion of the base part 60 located inward (e.g., plate part 604A) so that the locking parts 501 is bent inward to thereby release the locking between the locking parts 501 and the base part 60 of the support member 6 (see FIG. 5). This allows the user to remove the support member 6 from the support attaching part 50.

To attach the support member 6 to the support attaching part 50, the user pushes the base part 60 of the support member 6 into the attaching recess 500 with his or her finger. In this embodiment, when the support member 6 is pushed into the attaching recess 500, portions of the base part 60 located outward (e.g., placement legs 603A) come into contact with the locking parts 501 to cause the locking parts 501 to be bent outward and move the base part 60 of the support member 6 outward of the locking parts 501. As described above, the base part 60 of the support member 6, which serves as the locking part of the support member 6, moves outward to fit in the attaching recess 500, which serves as the locked part of the support attaching part 50.

According to the mouse 1 described above, the damaged or worn-out support member 6 can be replaced by a new support member 6; such a configuration therefore eliminates the necessity to purchase a new mouse 1 even when the support member 6 is damaged or worn out, which is cost effective.

In the mouse 1 of this embodiment in which the support member 6 can be replaced as a unit of the base part 60 and the support part 61, the support member 6 is easily replaceable. Specifically, even when different types of support parts 61 (e.g., the artificial ruby ball 61A and the bearing 61B) are to be replaced, the entire units (support members 6) can be easily replaced. The support member 6 larger than the support part 61 is more easily replaceable than in the case where the support part 61 alone is replaced.

In the mouse 1 of this embodiment, the support member 6 is easily replaceable by removing the damaged or worn-out support member 6 from the attaching recess 500 and fitting a new support member 6 in the attaching recess 500.

It is conceivable to sell a replacement support kit 100 used for such a mouse 1. This replacement support kit 100 is used for the mouse 1 configured to allow an input operation to a computer and including: the mouse body 3 including the receiving recess part 5 formed to be recessed inward; and the ball body 4 having a spherical shape and rollably received in the receiving part 2. The replacement support kit 100 also includes the support member 6 configured to be attachable to and detachable from the inside of the receiving recess part 5 for supporting the ball body 4 received in the receiving recess part 5.

The replacement support kit 100 further includes the detaching jig 7 used for removing the support member 6 from the receiving recess part 5 by being locked to the support member 6 attached to the receiving recess part 5. In this embodiment, the replacement support kit 100 includes three support members 6 and one detaching jig 7.

Purchasing this replacement support kit 100 enables the damaged our worn-out support member 6 to be replaced by a new one and thus eliminates the necessity to purchase a new mouse 1 even when the support member 6 is damaged or worn out, which makes the mouse 1 cost effective.

Further, in the replacement support kit 100 of this embodiment, the support member 6 can be easily attached to and detached from the mouse 1 using the detaching jig 7 included in the kit 100 to easily replace the support member 6.

The number of support members 6 included in the replacement support kit 100 can be one, two, or four or more. The number of support members 6 included in the replacement support kit 100 can be equal to the number of support members 6 to be attached to one mouse 1, or can be more or less than the number of support members 6 to be attached to the one mouse 1. The replacement support kit 100 can include different types of support members 6, or can include only a single type of support members 6.

The replacement support kit 100 can include only the support members 6 with no jig. In this case, the user can remove the support member 6 from the receiving recess part 5 using a jig such as commercially available tweezers.

It is a matter of course that the mouse of the present disclosure is not limited to the aforementioned embodiment, but various modifications can be made without departing from the gist of the present disclosure. For example, a configuration of an embodiment can be added to a configuration of another embodiment, and part of a configuration of an embodiment can be replaced by a configuration of another embodiment. Further, part of a configuration of an embodiment can be deleted.

The support member 6 of the aforementioned embodiment is configured such that the user cannot remove the support part 61 from the base part 60, but the support member 6 can be configured to allow the user to remove the support part 61 from the base part 60. In this case, the configuration can be such that the user is allowed to replace the support part 61 alone. For example, when the artificial ruby ball 61A is worn out, the user can remove the support member 6 from the receiving recess part 5 and remove only the artificial ruby ball 61A from the base part 60 A of the support member 6 for replacement. Thereafter, the user can attach a new artificial ruby ball 61A to the base part 60A, and then attach the support member 6 to the receiving recess part 5.

The aforementioned embodiment has been described by taking, for example, the case where most portions of the base part 60 of the support member 6 are located outward of the inner surface 52 of the receiving recess part 5, but the configuration can be such that the entire base part 60 is located outward of the inner surface 52 of the receiving recess part 5. The configuration can also be such that most portions of the base part 60 are located inward of the inner surface 52 of the receiving recess part 5, or the entire base part 60 is located inward of the inner surface 52.

The above embodiment has been described by taking, for example, the case where the first base part 60A of the support member 6A is formed of two parts namely the first mount part 601A and the placement part 600A on which the artificial ruby ball 61A is placed, but the configuration can be such that the first base part 60A can be formed of a single part or formed of three or more parts.

The aforementioned embodiment has been described by taking, for example, the case where the support member 6B includes one bearing 61B, but the support member 6B can include a plurality of the bearing 61B. In this case, the configuration can be such that the plurality of bearings 61B are attached to the shaft part 600B of the second base part 60B. The second base part 60B of the support member 6B in the aforementioned embodiment is formed of two parts namely the shaft part 600B and the second mount part 601B, but the configuration can be such that the second base part 60B is formed of one part, or formed of three or more parts.

The aforementioned embodiment has been described by taking, for example, the case where the support attaching part 50 has the attaching recess 500 in which the support member 6 fits, but the configuration can be such that the support attaching part 50 has a through hole in which the support member 6 fits in substitution for the attaching recess 500.

The aforementioned embodiment has been described by taking, for example, the case where the detaching jig 7 is the tweezers, but the jig can be another jig such as a screwdriver. When the detaching jig 7 is a screwdriver, the configuration can be, for example, such that one insertion hole 502 of the support attaching part 50 is formed for each attaching recess 500 to allow the screwdriver to be inserted into the insertion hole 502.

The following presents a simplified summary of the invention disclosed herein in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

A mouse of the present disclosure includes: a ball body having a spherical shape; and a mouse body including a receiving part in which the ball body having the spherical shape is rollably received, the receiving part including: a receiving recess part opening outward and formed to be recessed inward to receive the ball body therein; and a support member disposed on the receiving recess part for supporting the ball body received in the receiving recess part, in which the support member is configured to be attachable to and detachable from the receiving recess part.

Such a configuration enables the damaged or worn-out support member to be replaced by a new support member, and thus eliminates the necessity to purchase a new mouse even when the support member is damaged or worn out, which is cost effective.

The mouse can further be configured such that the receiving recess part includes a support attaching part to which the support member is detachably attached, and the support member includes: a base part attachable to and detachable from the support attaching part; and a support part disposed on the base part for supporting the ball body received in the receiving recess part.

Such a configuration enables the support member to be replaced as a unit of the base part and the support part, which makes the support member easily replaceable.

The mouse can further be configured such that the support attaching part includes an attaching recess formed to be recessed within the receiving recess part, and the support member is made to be attachable to or detachable from the support attaching part by allowing the base part to be fitted in or removed from the attaching recess.

Such a configuration enables the support member to be easily replaced by removing the damaged or worn-out support member from the attaching recess and fitting a new support member in the attaching recess.

A replacement support kit according to the present disclosure is a replacement support kit used for a mouse including: a mouse body configured to allow an input operation to a computer and including a receiving recess part formed to be recessed inward; and a ball body having a spherical shape and rollably received in the receiving recess part, the replacement support kit including a support member configured to be attachable to and detachable from an inside of the receiving recess part for supporting the ball body received in the receiving recess part.

Such a configuration enables the damaged or worn-out support member to be replaced when the replacement support kit is purchased, which makes the mouse cost effective.

The replacement support kit can further include a detaching jig used for removing the support member from the receiving recess part by being locked to the support member attached to the receiving recess part.

Such a configuration enables the support member to be easily detached from the support member for replacement using the detaching jig.

What is claimed is:

1. A mouse comprising:

one ball body having a spherical shape; and a mouse body comprising a receiving part in which the one ball body having the spherical shape is rollably received, the receiving part comprising: a receiving recess part opening outward and formed to be recessed inward to receive the one ball body therein; and a plurality of support members disposed on the receiving recess part for supporting the one ball body received in the receiving recess part, wherein the plurality of support members are configured to be attachable to and detachable from the receiving recess part, the receiving recess part comprises a recessed surface part that partially covers the one ball body from a bottom side, and a plurality of support attaching parts to which the plurality of support members are detachably attached respectively, each of the plurality of support members comprises: one base part attachable to and detachable from each corresponding one of the plurality of support attaching parts; and one or more support parts disposed on the one base part for supporting the one ball body received in the receiving recess part, the one or more support parts for the plurality of support members support the one ball body by contacting the one ball body, each of the plurality of support attaching parts comprises an attaching recess formed to be recessed within the receiving recess part and in a thickness direction of the recessed surface part, and each of the plurality of support members is made to be attachable to or detachable from each corresponding one of the plurality of support attaching parts by allowing the one base part to be fitted in or removed from the attaching recess.

2. A replacement support kit used for a mouse comprising: a mouse body configured to allow an input operation to a computer and comprising a receiving recess part formed to be recessed inward; and one ball body having a spherical shape and rollably received in the receiving recess part, wherein the receiving recess part comprises a recessed surface part that partially covers the one ball body from a bottom side, and a plurality of support attaching parts to which a plurality of support members are detachably attached respectively on one-to-one correspondence, the plurality of support members configured to be attachable to and detachable from an inside of the receiving recess part for supporting the one ball body received in the receiving recess part, and each of the plurality of support attaching parts comprises an attaching recess formed to be recessed within the receiving recess part and in a thickness direction of the recessed surface part, the replacement support kit being configured such that, each of the plurality of support members comprises: one base part attachable to and detachable from each corresponding one of the plurality of support attaching parts; and one or more support parts disposed on the one base part for supporting the one ball body received in the receiving recess part, the one or more support parts for the plurality of support members support the one ball body by contacting the one ball body, and each of the plurality of support members is made to be attachable to or detachable from each corresponding one of the plurality of support attaching parts by allowing the one base part to be fitted in or removed from the attaching recess.

3. A mouse comprising:

a mouse body configured to allow an input operation to a computer and comprising a receiving part formed to be recessed inward; and one ball body having a spherical shape and rollably received in the receiving part, the receiving part comprising: a receiving recess part opening outward and formed to be recessed inward to receive the one ball body therein; and a plurality of support members disposed on the receiving recess part for supporting the one ball body received in the receiving recess part, wherein the plurality of support members are configured to be attachable to and detachable from the receiving recess part, the receiving recess part comprises a recessed surface part that partially covers the one ball body from a bottom side, and a plurality of support attaching parts to which the plurality of support members are detachably attached respectively, each of the plurality of support members comprises: one base part attachable to and detachable from each corresponding one of the plurality of support attaching parts; and one or more support parts disposed on the one base part for supporting the one ball body received in the receiving recess part, the one or more support parts for the plurality of support members support the one ball body by contacting the one ball body, and each of the plurality of support attaching parts has an attaching recess formed to be recessed within the receiving recess part and in a thickness direction of the recessed surface part, and comprises a locking part locked to the base part of each of the plurality of support members attached to the attaching recess.

4. A replacement support kit applicable to a mouse comprising:

a mouse body configured to allow an input operation to a computer and comprising a receiving recess part formed to be recessed inward; and a ball body having a spherical shape and rollably received in the receiving recess part, the replacement support kit comprising:

a support member configured to be attachable to and detachable from an inside of the receiving recess part for supporting the ball body received in the receiving recess part; and a detaching jig used for removing the support member from the receiving recess part by being locked to the support member attached to the receiving recess part, wherein a support attaching part disposed in the receiving recess part and to which the support member is detachably attached has an insertion hole into which the detaching jig is inserted when the support member is detached from an attaching recess formed to be recessed within the receiving recess part, and the detaching jig is inserted into the insertion hole to be locked to the support member.

* * * * *